United States Patent
Bloch et al.

(10) Patent No.: US 7,609,684 B2
(45) Date of Patent: Oct. 27, 2009

(54) LOCAL SOFT SWITCH AND METHOD FOR CONNECTING TO AND PROVIDING ACCESS TO A TDM NETWORK

(75) Inventors: Jack Bloch, Boca Raton, FL (US); Uwe Grothe, Delray Beach, FL (US); Amruth Laxman, Boca Raton, FL (US); Narendar Reddy, Boca Raton, FL (US); Salim Saba, Boca Raton, FL (US); Robert S. Stockdale, Lake Worth, FL (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 440 days.

(21) Appl. No.: 10/544,417

(22) PCT Filed: Feb. 3, 2004

(86) PCT No.: PCT/EP2004/000976

§ 371 (c)(1),
(2), (4) Date: May 4, 2006

(87) PCT Pub. No.: WO2004/071109

PCT Pub. Date: Aug. 19, 2004

(65) Prior Publication Data

US 2006/0176840 A1 Aug. 10, 2006

Related U.S. Application Data

(60) Provisional application No. 60/444,924, filed on Feb. 4, 2003.

(51) Int. Cl.
*H04L 12/66* (2006.01)
*H04J 3/22* (2006.01)
*H04J 3/16* (2006.01)

(52) U.S. Cl. .................. 370/352; 370/463; 370/466

(58) Field of Classification Search ............... 370/315, 370/535, 351, 352, 353, 354, 355, 356, 360, 370/463, 466

See application file for complete search history.

(56) References Cited

U.S. PATENT DOCUMENTS 6,304,650 B1 * 10/2001 Takeshita .................. 379/219
2002/0191616 A1 * 12/2002 Sarmiento et al. .......... 370/400

OTHER PUBLICATIONS

Troost, WO 01/45366 A2, Jun. 21, 2001, WIPO, all pages.*
Dhar, "Implementing CALEA", Dec. 2002, Bechtel Telecommunications Technical Journal, all pages.*
Rabie, "Activity-Based user Interface for Network Management", 1989, IEEE, all pages.*

(Continued)

*Primary Examiner*—Kwang B Yao
*Assistant Examiner*—Adam Duda
(74) *Attorney, Agent, or Firm*—Laurence A. Greenberg; Werner H. Stemer; Ralph E. Locher

(57) ABSTRACT

A remote switch for connecting to and providing access to a TDM network. A switch resident of a non-TDM network implements control of various components in order to effectuate telecommunications in the non-TDM network. An access gateway at a remote location connects to the TDM network. The switch accesses the TDM network through the access gateway via the connection.

15 Claims, 7 Drawing Sheets

OTHER PUBLICATIONS

RADVISION, "Implementing Media Gateway Control Protocols", Jan. 27, 2002, RADIOVISION, all pages.*

Techfest, "ISDN Overview", Aug. 31, 2000, Techfest, all pages.*

H.248.1, "Series H: Audiovisual and Multimedia Systems Infrastructure of audiovisual services—Communication Procedures: Gateway Control Protocol: Version 1", Mar. 2002, ITU-T, all pages.*

Cuervo, "RFC 3015—Megaco Protocol Version 1.0", Nov. 2000, IETF, all pages.*

Ramnath A. Lakshmi-Ratan, "The Lucent Technologies Softswitch—Realizing the promise of convergence", Bell Labs Technical Journal, vol. 4, Issue 2, pp. 174-195, Apr.-Jun. 1999, XP000851517, Abstract.

Ramnath A. Lakshmi-Ratan, "The Lucent Technologies Softswitch—Realizing the Promise of Convergence", Bell Labs Technical Journal, vol. 4, Issue 2, Apr.-Jun. 1999, pp. 174-195, XP000851517.

* cited by examiner

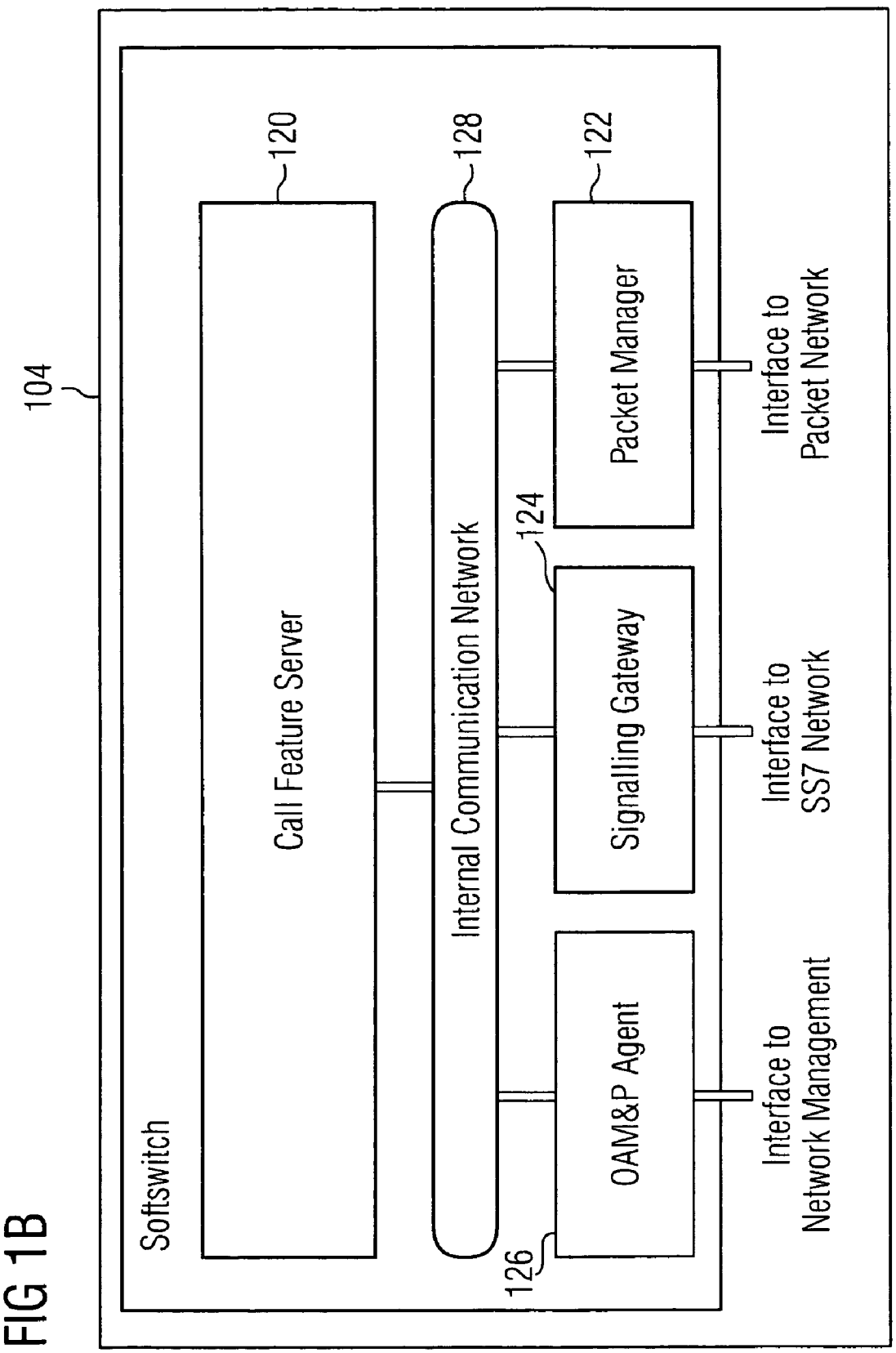

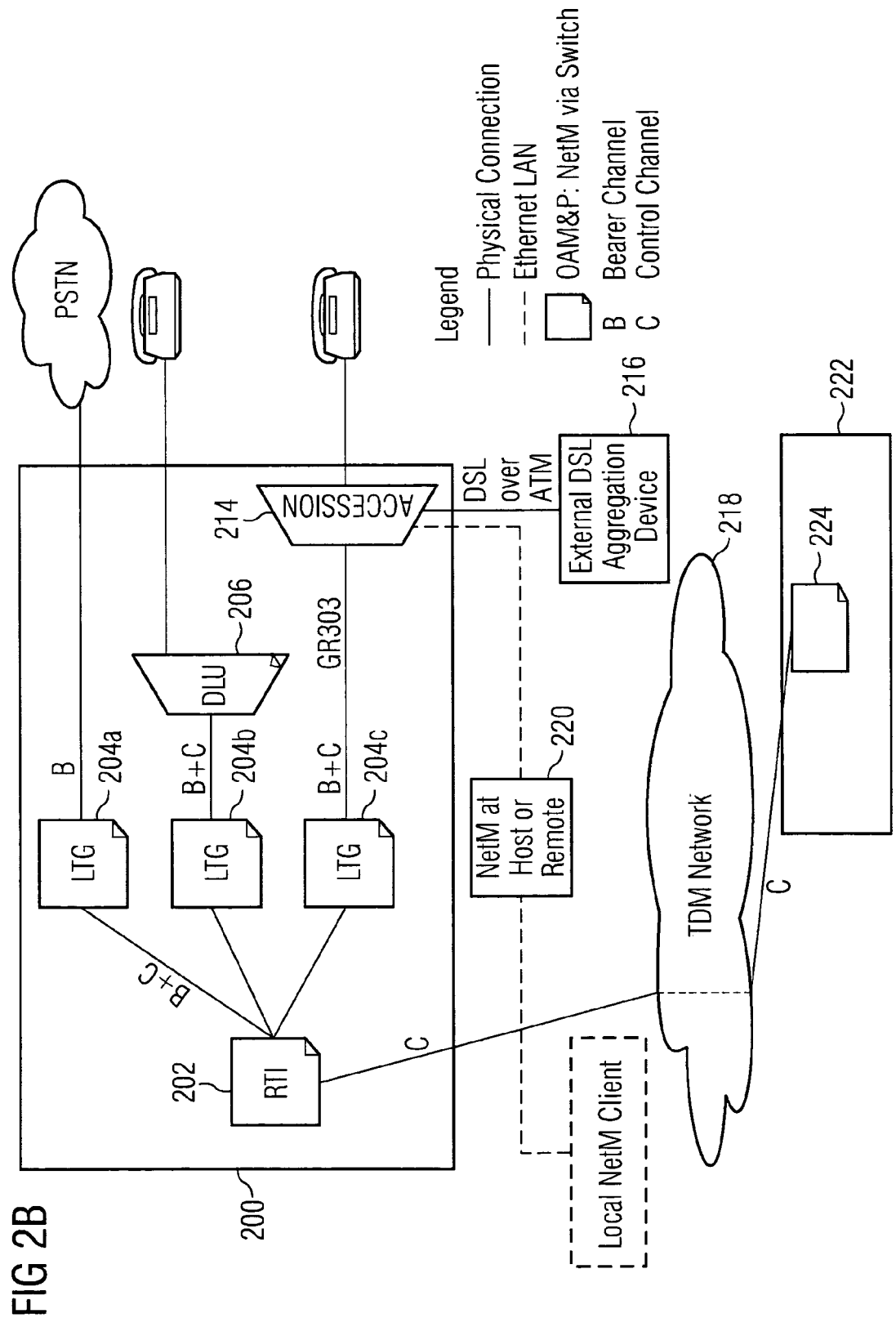

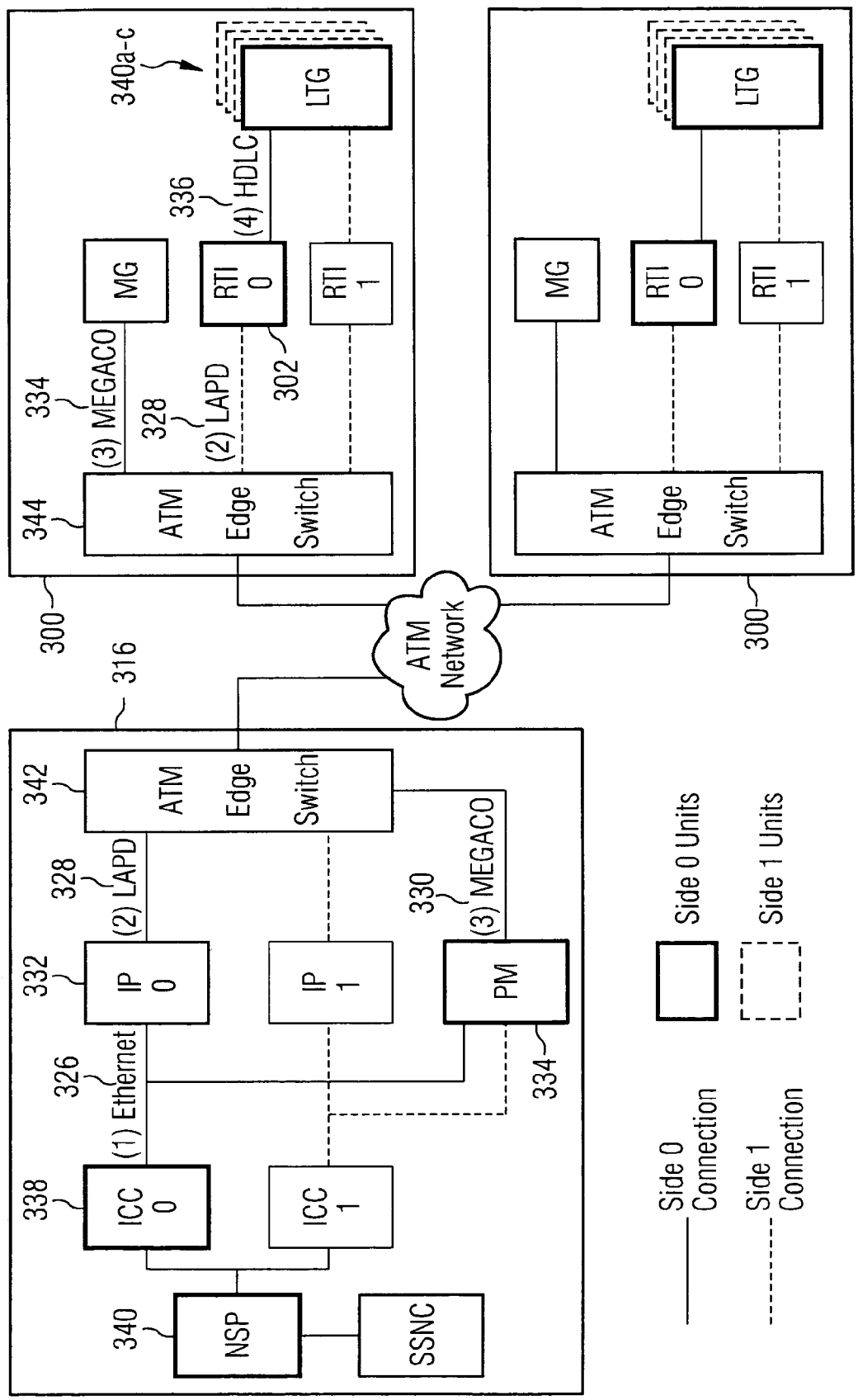

LOCAL SOFT SWITCH AND METHOD FOR CONNECTING TO AND PROVIDING ACCESS TO A TDM NETWORK

CROSS REFERENCE TO RELATED APPLICATIONS

This application is the U.S. National Stage of International Application No. PCT/EP2004/000976, filed Feb. 3, 2004 and claims the benefit thereof. The International Application claims the benefits of U.S. provisional application No. 60/444,924, filed Feb. 4, 2003, both applications are incorporated by reference herein in their entirety.

FIELD OF THE INVENTION.

The present invention provides a local switch that controls one or more resident switches through a remote gateway and, more particularly, a local software switch, or soft switch, that controls one or more remote access gateways via a TDM link in telecommunications network.

SUMMARY OF THE INVENTION

The Next Generation Network (NGN) will eventually replace the arcane Time Division Multiplexing (TDM) telecommunications networks of old. Although NGN is superior in almost every way, the main stumbling block to NGN's wide acceptance is that the TDMs are fixed networks that are physically integrated throughout a given geographic region. Replacing these networks with an upgrade, even though technologically superior in almost every respect, would be a costly and enormous undertaking. Naturally, local carriers, who support such Networks, have a disincentive to make improvements in the face of these underpinnings and would rather adhere to an older, but operational, technology.

In order to encourage the implementation of NGN, companies such as Siemens™ have adapted their technology to integrate with legacy systems. For example, Siemens™ has been successful with converting DCO network to its EWSD™ Systems while saving the line access equipment from the DCO.

However, the EWSD conversion solution does not fully address the situation that the legacy systems are TDM networks. For this reason, customers have been integrating sub-standard TDM solutions, mostly which provide an NGN look and feel, but not the full range of NGN capabilities and services that EWSD offers.

These are typically smaller footprint, Gigabit back plane, ATM/IP interfaces.

What is needed, therefore, is a solution that integrates the capabilities and services of NGN with the legacy TDM networks. Currently no soft switch has controlled a smart remote or existing TDM subscribers.

An object of the invention is to integrate the capabilities and services of NGN with the legacy TDM networks.

Another object of the invention is to address the demand by customers to integrate to legacy TDM networks.

Still another object of the invention is to "Seed" Packet Switch Solution in the IOC Market.

Yet another object of the invention is to build NGN awareness and acceptance.

A still further object of the invention is to provide a new migration strategy in line with Packet Local Switch.

A remote switch for connecting to and providing access to a TDM network. A switch resident of a non-TDM network implements control of various components in order to effectuate telecommunications in the non-TDM network. An access gateway at a remote location connects to the TDM network. The switch accesses the TDM network through the access gateway via the connection.

The remote switch may be realized by the introduction of a local soft switch which addresses these key concerns whilst improving legacy capabilities and services to NGN.

BRIEF DESCRIPTION OF THE DRAWINGS

In the following figures, at least one example of the embodiment of the invention is shown, wherein:

FIG. 1b illustrates the switch of the invention;

FIG. 2b illustrate the remote access gateway of the invention in operation;

FIG. 3c illustrates the signalling of the switch and remote access gateways of the invention.

DETAILED DESCRIPTION OF INVENTION

One way to provide TDM connectivity would be to bridge the soft switch to the TDM subscriber via the use of a very expensive media gateways (MGs). However, expenses are one critical reason customers were chilled away from upgrading in the first place. For this reason as well, use of MGs is not a proven method to meet the foregoing objectives.

Figure 1A:
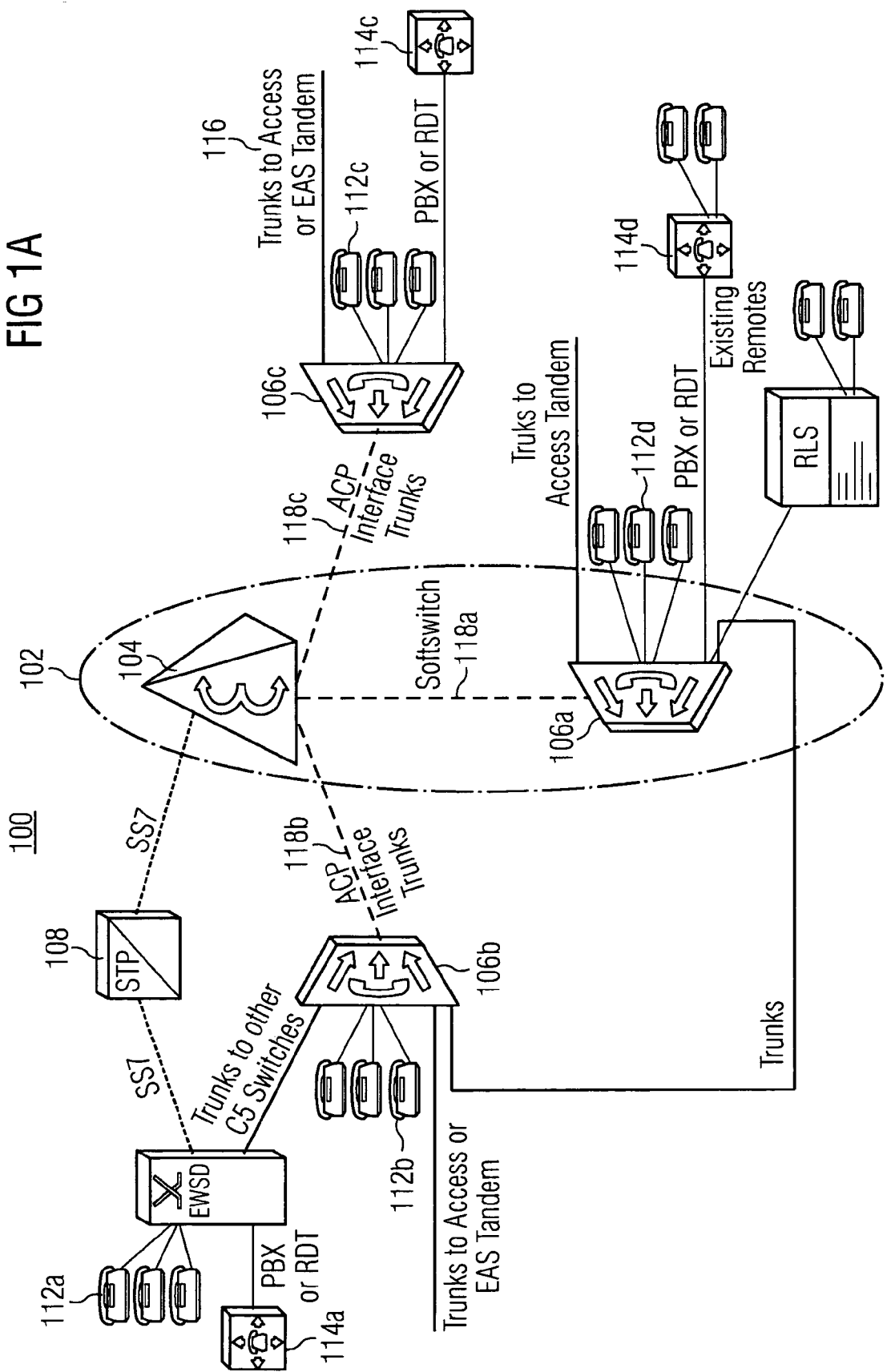
FIG. 1a illustrates the system of the present invention.

The present invention provides a local soft switch that controls one or more remote access gateways via a TDM link in telecommunications network. As will now be appreciated from FIG. 1a, which shows the telecommunications system 100 of the invention, the local soft switch 102 consists of the soft switch 104 providing call control and one or more access gateways 106a-c providing voice access and other capabilities and services.

FIG. 1. illustrates that the invention is based on a distributed architecture and supports various types of subscribers, not only TDMs. There is shown, for example, connection through a signal transfer point 108 to an EWSD call center 110 for access to signaling system 7 subscribers 112a or a PBX or RDT 114a. There is also shown connections through the access gateways 106b and c to an Access or EAS Tandem subscribers 116a and b which may also co-support access to telephone subscribers 112b-d or the PBX or RDT 114b-d. ACP interfaces trunks 118a-c may provide the connectivity to the access gateway 106a-c.

The switch 104 implements control of access equipment, media gateways and resource servers and coordinates the network intelligence present in the different members of the network. It can optionally include a multi protocol signaling gateway functionality. An example of the switch 104 is shown in FIG. 1b and employs a modular architecture that allocates the functions of the soft switch.

At the heart of the switch is the Call Feature Server 120 that handles call control including call signal processing, call establishment, service delivery such as interworking with the IN and related management aspects, such as collection of billing data. The Call Feature Server provides a platform for NGN services by offering all the features of traditional voice networks.

The Packet Manager 122 provides high-performance connection control for voice or multimedia connections. The Packet Manager's task is to ensure proper interworking between PSTN and IP-based networks by managing the mediation resources at the Media Gateway via MGCP or MEGACO/H.248 protocols. The Packet Manager also terminates the signaling for H.323 and SIP users. In this way H.323/SIP subscribers can access the features and call control of the switch. All known voice features existing in the PSTN world are provided to the NGN by using the known H.323, SIP and MGCP/MEGACO protocols.

The SS7 Signaling Gateway 124 is designed to handle SS7 signaling delivered over SCTP/IP, classic TDM connections, and ATM high-speed signaling links. As it is based on a modular design, the system scales from very small up to high-end configuration capability, which assures high granularity for expansion.

The OAM&P agent (Operation, Administration, Maintenance and Provisioning) 126 agent gives the soft switch management capabilities. It provides the interface to the user interface Manager (discussed below) so that such tasks as the sending of alarms and events, database maintenance, and system configuration can be completed. The OAM&P agent also provides an additional interface for billing that automatically sends billing data to a post processing system. An internal communication network handles the internal communications, which shall not be discussed here.

In operation, the local soft switch 102 solution provides the functions of one or more small TDM class-5 or class-4 offices. In this was, the TDM components are accessed directly and access the services and capabilities of the soft switch 104. It shall be noted that the there is no need for EWSD RSU side door trunks, which would be costly to implement and the interface between soft switch 104 and the remote access gateways 106a-c is simplified with standard inter-office trunks, for example the ACP Interface Trunks.

In one embodiment, the soft switch may be provided by a modified SURPASS hiQ9200™. The hiQ 9200 platform is based on the hiQ 9200's architecture of R3. In order to implement the soft switch 104 of the present invention, the hiQ 9200 eliminates the Media Control Platforms (MCPs) and the Packet Manager. As a result there will be some loss of functionality when compared to an EWSD/Smart Remote network deployment, but this the trade off for a relatively cheap alternative to implementing a full TDM interface. Another modification that shall be made is that subscribers, such as Centrex, EKTS, Bridged service, GR303 interfaces, MLHGs, and traditional Trunk Groups are restricted by the software such that they do not cross remote access gateway boundaries.

With this arrangement, the hiQ 9200 provides the functionality to control the remote access gateway 106a, which provides subscriber line access in a hiQ 9200 environment. Through this control, subscribers connected to the network via remote access gateways have access to the same Class 5 feature set as available on the hiQ 9200. The local soft switch uses the Siemens proprietary Access Control Protocol (ACP) to provide call and feature control for remote access gateways in the network. One hiQ 9200 is able to control up to 14 remote access gateways in practice, but this can be expanded naturally. The ACP protocol is transported via DS-1 facilities between the hiQ 9200 and the SLSS remote access gateway.

With current technology, a local soft switch 102 and a remote access gateway 106a can be separated by up to 3,000 miles. The communication links between the hiQ and the remote access gateway require roughly 2×64 Kbps (2 DS0s) of bandwidth per LTG in the remote access gateway, along with 2×64 Kbps (2 DS0s) of bandwidth for the RSUCs in the remote access gateway. There is no sharing of T1 facilities between remote access gateways.

The local soft switch, or in short "TDM Soft Switch", addresses the need in the IOC (Independent Operating Companies) market. The essence of the idea to bring "Next Generation Soft Switch Technology" to the TDM sector of Independent Operating Company (IOC) market in order to meet the need to integrate with TDM legacy systems has been fulfilled. With these new NGN switch providers will provide solutions that are IP, ATM, and TDM converged systems with high port density and low footprint at low per port cost.

The idea behind this invention is two-fold: first, the concept of applying Next Gen Soft Switch methodologies to the legacy TDM network infrastructure is thought to be a new approach with significant benefits to the networks of larger IOCs who all have a tendency toward a host/remote network architecture and at the sane time want to migrate to Next Gen solutions. Second, the submittal of the concept for provisional filing will be a far reaching advancement in host/remote network architecture in a TDM infrastructure. Because migration from TDM to Packet in the IOC market is slower than previously anticipated, this new approach has an excellent chance of succeeding as a migration strategy. In addition, it would allow deployment of predecessors of the NGN.

As earlier mentioned, the switch may be a derivative of the HiQ9200. Because there is no packet traffic in this solution, the HiQ9200 Media Control Processors (MCP) as well as the Packet Manager are not needed. What is left in the HiQ9200 is—aside from internal LAN infrastructure—the SSNC SS7 Signaling System, the CP113E based Network Control Processor (NCP), and the Host-Remote Interface Processor (IP), which controls the message, based communication with the remote access gateways. There is no longer bearer traffic between the host and remotes. Side door trunks interconnecting remote access gateways need not be supported. The soft switch no longer provides switching and tandem capabilities, which means that all TDM switching and networking are handled via the limited TSI (time slot interchange) switching matrix in the remote access gateway. This does restrict the network capacity of this solution compared with a conventional EWSD based host solution, but offers direct TDM connectivity.

The TDM Soft Switch solution essentially supports the same robust and reliable TDM interfaces and capabilities that the EWSD switching system is known for. This solution can be used to replace and consolidate large portions of the legacy networks of the IOCs and at the same time significantly lower OPEX. One key advantage is that once deployed this TDM network solution can be upgraded to a packet infrastructure with relatively minor additions to the soft switch and remote access gateways, and by introducing a QoS packet based core network. This in turn opens the possibility for the introduction of new revenue producing IP based services.

The remote access gateway 200 (FIG. 1a, 106a) will now be described in more detail with reference to FIG. 2a. The Remote Interface (RTI) 202 consists of several hardware components that work together to provide timeslot switching and control functionality. The RTI has two external interfaces—interfaces to LTGs 204a-c and interfaces to the network. The LTG interface consists of 8 Mb/s SDC connections that transport speech, as well as a single timeslot of control information transported using HDLC (the LTG message channel). The network interface consists of PCM spans that transport speech (to the hiG 2000) or control information over LAPD (to the hiQ).

The RTI includes a number of components including a Remote Switching Unit Controller (RSUC) which is basically a processor, for example a modified Intel 486 based processor board and additional LAPD communication hardware. The main functions of the RSUC are to manage the other RTI components. It also provides interfaces with the Network Service Platform (NSP) of the switch for maintenance and call switching. It further manages the LTG and RTI communication to the switch and routes calls when operating in Standalone Service mode. A message Handler (MH), which uses a similar hardware platform as the RSUC, provides a bridge between the LTG HDLC interface and the switch-access gateway LAPD interface. The Message Handler is responsible for performing Layer-2 functions for HDLC & LAPD, as well as proper routing of messages within the RTI and between the LTGs and the switch. A Time Slot Interchange Matrix (TSIM) provides physical timeslot switching capability between a given pair of time slots.

The Access Multiplexer (AMUX) 208 provides the time slot interface to the TSIM. It is preferred that the components of the RTI is connected to an AMUX, which is then connected to the TSIM. This simplifies the inter-connection of the various components and speech highways. Additional AMUXs may be added as more components (Message Handlers, DIUs etc.) are added. A Digital Interface Unit provides PCM connectivity to the network.

The Line Trunk Group (LTG) 204a-c may be existing components known to the EWSD standard that provide Line and Trunk interfaces. Each LTG can support DLU, GR-303 or One-Up interfaces for subscriber lines. MF Trunks, SS7 Trunks or PRI links can also be supported.

The Digital Line Unit (DLU) 206 is also an existing EWSD component that provides physical connectivity for subscriber lines. The DLU can be co-located with the hiA or be placed at a remote location. Remote access using SLC96 from a co-located DLU is also supported. Variants of the DLU can also be used to provide DSL access (using the Packet Hub).

The Media Gateway (MG) 210 provides TDM to ATM conversion for the speech trunks that originate from the access gateway. It is a standard ATM Media Gateway, with DS3 input and ATM output. The MG supports the known MEGACO protocol for media gateway control.

Ab M1/3 Multiplexer (M1/3 Mux) 208 is used to concentrate PCM 24 interfaces from the RTI into DS3 interfaces for the MG 210. Any standard M1/3 Mux can be used for this function.

An ATM Edge Switch 212 provides connectivity between the remote access gateway and the ATM network. These switches provide standard ATM transport, as well as Circuit Emulation services for transport of the RTI LAPD communication channels to the switch.

Now in operation, the remote time slot interchange (RTI) 202 is connected to a series of line trunk groups (LTG) 204 a-c through a bearer and or control channel B+C. The RTI consists of several hardware components that work together to provide timeslot switching and control functionality. The RTI has two external interfaces—interfaces to LTGs and interfaces to the network.

The LTG interface consists of SDC connections that transport speech, as well as a single timeslot of control information transported using HDLC (the LTG message channel). Calls originating on the remote access gateway 200 can be switched within the same smart remote to line or trunk destinations, using the RTI and associated Time Slot Interchange Matrix (TSIM) (not shown). The line trunk groups 204a-c are connected to various types of subscribes, including POTS, xDSL (UDSL, ADSL, SDSL), Coin, ISDN BRI, ISDN PRI, MF trunks, SS7 trunks, and TR8/GR303 interfaces.

Figure 2A:
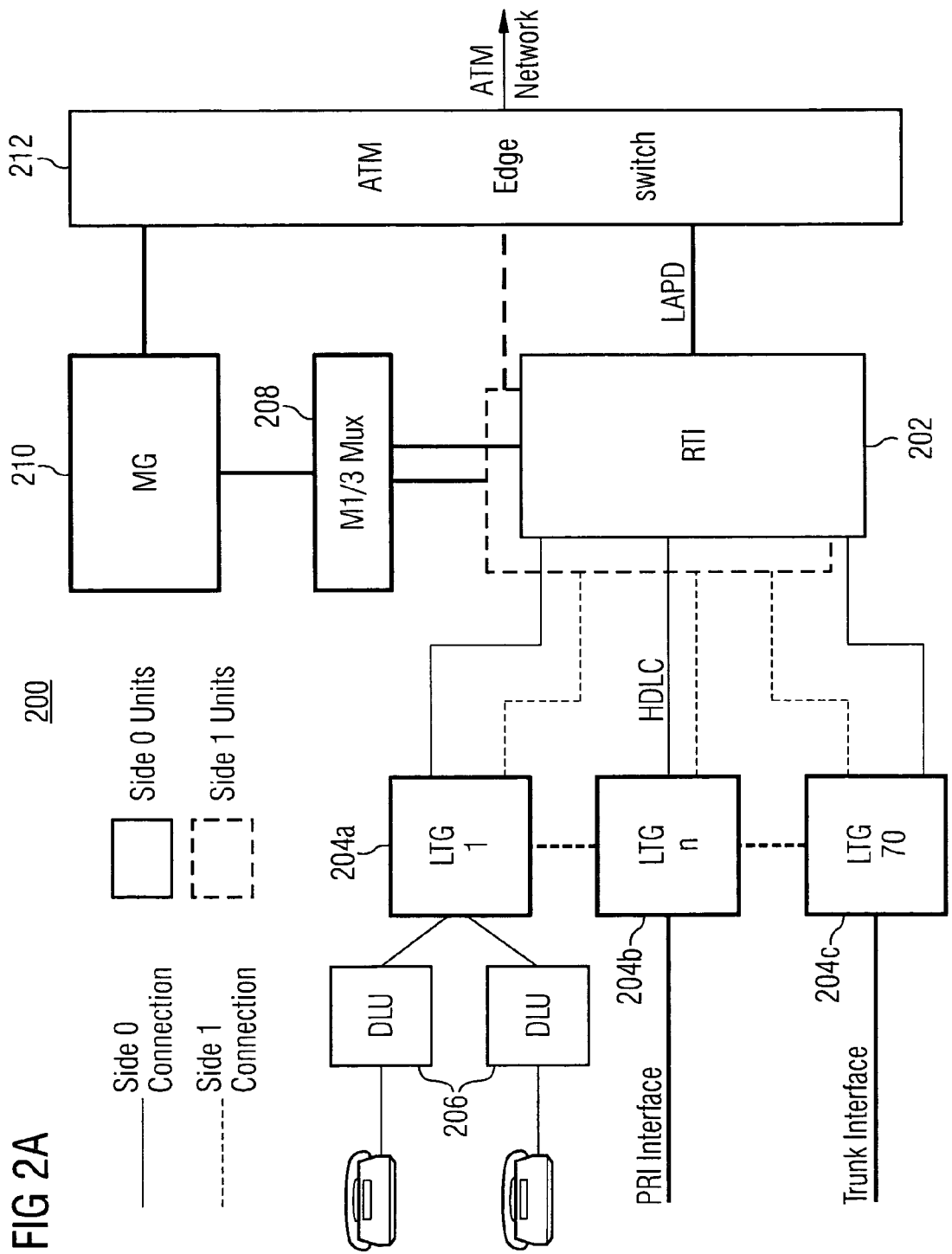
FIG. 2a illustrates the remote access gateway of the invention.

The interaction of the remote access gateway with the outside world shall now be discussed in more detail with respect to FIG. 2b, wherein elements already discussed are indicated by the same reference numerals as in FIG. 2a. It shall be noted that at a remote access gateway site, line terminations can be provided in one of two ways, either by a digital line unit (DLU) 206 or by an access platform 214. The access platform provides narrow band telephony and broadband services over existing copper telephone lines. The access platform 214 provides xDSL access to an external DSL 216 either operating wholly as a DSLAM or as a combined Line Access Unit with integrated DSLAM capabilities. The DLU is provides Metallic Test Access via no-test-trunk interface, External alarm input via the ALEX Module and Board to Board testing.

The RTI 202 connects through a control channel to the TDM network 218. Each remote access gateway 200 functions as a self-contained TDM switch, there are no side-door trunks between remotes and connections between them are provided by inter office trunks. Call processing functionality is identical for calls between (a) two smart remotes controlled by the same switch, (b) two smart remotes controlled by different switches, (c) one smart remote and a standard local TDM switch.

The remote access gateway is the point of presence for the switch in a geographic area. It allows all existing TDM connection types (including DSL traffic) and ATM trunks to be cross-connected at a location physically remote from the call control point (i.e., the switch). In addition to the support of legacy TDM facilities, the remote access gateway also provides for direct connection to the ATM network, as well as providing facilities for ATM data concentration.

In practice, the remote access gateway and its extensive connection capabilities may be based on the existing EWSD RSU, the SURPASS hiG, and the XpressPass 140/144. Together they make up the remote access gateway. A new method of transporting the ACP messages between the switch and remote locations is introduced by this invention. That is, call processing changes are made to allow for both intra-remote access gateway calls and TDM-ATM interworking to allow calls to and from the ATM network from within the remote access gateway.

It has been proven in the laboratory that a remote access gateway can support 70 LTGs, the same as in the RSU (due to the size of the TSI matrix), can be up to 14 remotes controlled by a single switch and a switch and a remote can be separated by up to 3,000 miles. Although some subscribers, such as Centrex, EKTS subscribers, Bridged service subscribers, GR303 interfaces, MLHGs, and traditional Trunk Groups (not MG and MGCC) will have to be restricted such that they do not cross remote access gateway boundaries, each remote can support up to 25,000 subscribers.

The switch may also be supported by a user interface, known in the field as a Manager 220. The configuration may be a single server with multiple clients. The client may be either Windows or UNIX based clients. The Manager may be arranged to support the switch and will interface to it on a man-machine language MML and Q3 basis. The Manager 214 may offer all the FCAPS functionality.

As shown in FIG. 2b, the switch 222 includes an interface processor (IP) 224. As the RTI and LTGs at the remote site require communication channels to the switch 222, there is no need for TDM links between the two locations (unlike the case with the EWSD switch). Also physical HTIs at the switch are not needed. Thus, a new secure mechanism for NSP-LTG message transport of the ACP messages was created for this invention. A new IP processor, located at the switch site will be used to manage and control this message transport.

The IP processor 224 is attached to the Host LAN, here the TDM 218, with each of the processors attached to one LAN side (via the Ethernet board), and each to a Mux (via the T1 cards) and then to a Router to the external ATM network. It is the bridge between the LAN and the external remote network. The IP processor, may be paired, one operating separately from the other (i.e., no messages between themselves), each handling a set of active MCHs to their assigned LTGs (physically located at the hiA). The ICC routes messages to them and to their LTGs as it does to the other processors on the LAN, via their MAC addresses.

The primary function of the IP processor 224 is to perform protocol conversions and map the ACP messages onto the correct physical and logical connections. It makes use of the data contained in a Mapping Table while doing this. The goal is to have a fixed configuration for the IP processor to use in mapping the LTG/RTI channels to Mux ports. As shown in section, HSLs (High Speed Links) are no longer used from the switch host when communicating with the remote access gateways. In order to simplify architecture, each LTG and RTI MCH will be individually transported.

Using BOOTP, an Internet protocol that enables a diskless workstation to discover its own IP address, the IP address of a BOOTP server on the network, and a file to be loaded into memory to boot the machine are captured. This enables the workstation to boot without requiring a hard or floppy disk drive. The protocol is defined by IETF RFC 951. In this manner, the IP discovers its IP address. The IP may be provided by a reworked ICC on the cPCI bus using the Linux OS.

Figure 3A:
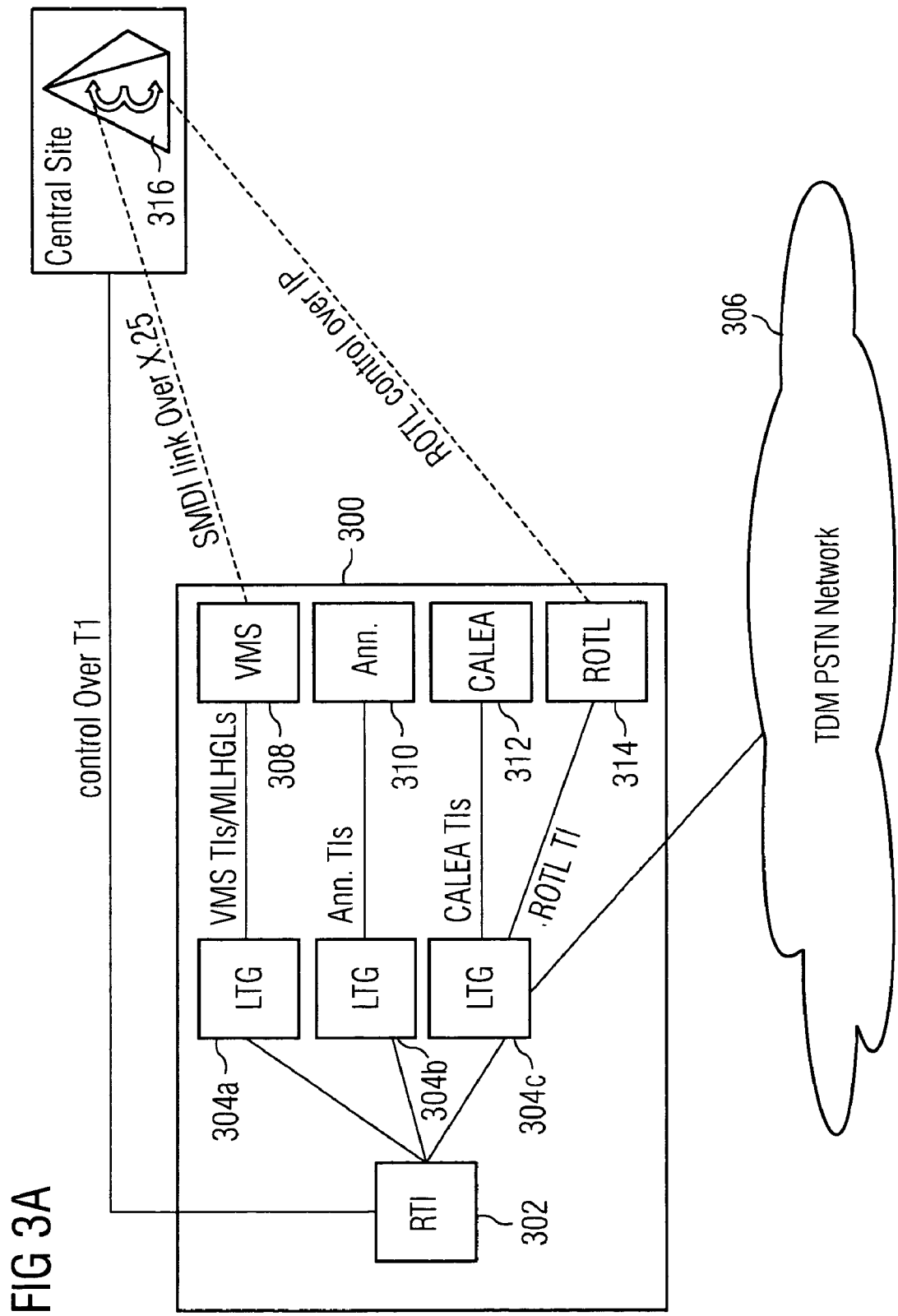
FIGS. 3a-b illustrate the operation of the remote access gateway and the switch of the invention.
Figure 3B:
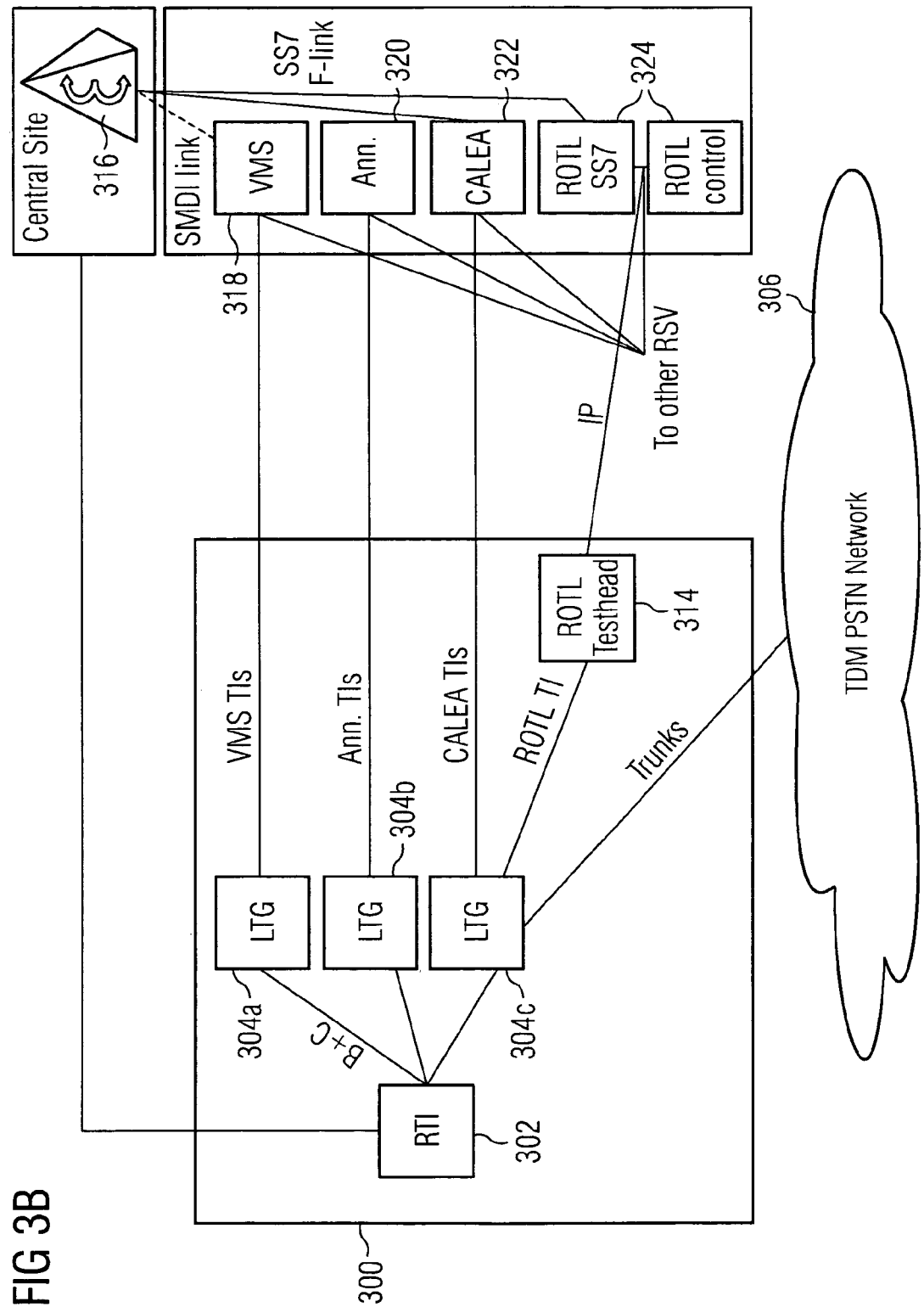

Now with respect to FIGS. 3a-c, TDM Trunking Options for Legacy Devices shall be discussed. For some legacy devices, which continue to use a TDM trunking interface, there are two options available to provide the interface. TDM Trunking to Collocated Equipment and TDM Trunking to Central Resources Via TDM Facilities. In the first option, shown in FIG. 3a, as in the previous figure, we have a remote access gateway 300, with similar features as previously discussed, including the RTI 302, LTGs 304 a-c and a connection to the TDM 306.

In addition, FIG. 3a illustrates that the invention is capable of TDM Trunking to Collocated Equipment. Here, each remote access gateway has its own Voice Mail Server 308, Announcement Server 310, and CALEA Server 312. It is suggested that these devices would all be physically located in the same room as the remainder of the remote access gateway equipment. The remote office test line (ROTL) 314 allows for automated trunk testing. The switch 316 is shown here connected to the remote 300 through a T1 line. It also connected to the VMS 308 through an SMDI link. The ROTL 314 is connected through ROTL over IP protocol.

The second option, shown in FIG. 3b, is TDM Trunking to Central Resources Via TDM Facilities. In this scenario, each remote access gateway is trunked via the TDM network to a centrally located Voice Mail Server 318, Announcement Server 320, and CALEA Server 322. These devices could all be physically located in the same room (typically at the remote site) or could each be a separate physical site. A ROTL SS7 and Control unit 324 could also be trunked as shown in the figure.

The CALEA Server 312 provides for lawful interception according to the known CALEA standard. To that end, this feature ports the CALEA capabilities software into the switch. The feature modifies the CALEA specific call processing logic to move the call content intercept access point for Intercept Subject Receive path from Switching Network SN to the RTI of the remote access gateway. This change is implemented if the SN module is not a part of the switch architecture. The feature also carries the EWSD Release 18.0 changes (made during the design and analysis phase) into the Local soft switch software environment. Further, the feature verifies (i.e., lab verification) that the available CALEA capabilities conform to the J-STD-025 specifications.

FIG. 3c illustrates the interaction of all the switch and the remote access gateway in more detail and shows the new communication interfaces that exist within the switch and between the switch and remote access gateway. An Ethernet LAN interface 326 is provided between the ICC and IP. An LAPD interface 328 between the IP and RTI. A MEGACO interface 330 between the PM and MG. Another LAPD interface 332 is provided between the IP and RTI. Another MEGACO interface 334 is provided between the packet manager PM (see FIG. 1b) and MG. An HDLC interface 336 is provided between the RTI and remote access gateway LTGs. There is shown in the figure a redundant IP, as well as redundant ICC and RTI.

The following describes how these interfaces are used in order to communicate with the various switch and access gateway components. The IP 332, as already mentioned, is a new unit on the switch LAN. Communication to the IP 332 is via the existing switch protocol, over Ethernet Interface 326. The IP is assigned a unique MAC address to distinguish it from other units on the LAN such as the PM 334 or MCPs. The IP in this embodiment shares the MCP multicast MAC address, so that it can participate in the LAN monitoring function provided by the ICC 338. The IP is also assigned new processor numbers and MBU/MCH values so that it can be addressed from the NSP 340. The ICC 338 routes messages with these MBU/MCH values to the IP 332. Responses from the IP 332 to the NSP 340 are also processed by the ICC 338, and forwarded to the NSP 340.

Communication to the RTI 336 from the switch 316 occurs from the Ethernet 326 to the IP 332. The communications to the LAPD 328 from the IP 332 to the ATM Edge Switch 342 over dedicated DS0s. LAPD 328 over ATM (Circuit Emulation Service) between the ATM Edge Switch 342 in the switch 316 and the Edge Switch 344 in the remote access gateway 344. LAPD 328 again between the remote access gateway Edge Switch 344 and the RTI over dedicated DS0s Note that the LAPD channel is not terminated by the ATM edge switches, but instead the corresponding DS0 is transported over ATM through the network.

Each remote access gateway LTG 304a-c is assigned two message channels—one for side 0 and one for side 1. Both channels are used by the NSP 340 in order to communicate with the LTGs 304a-c. Physically, these channels are terminated at the RTI 302, and use HDLC 336 to transfer messages between the RTI & LTG.

Communication with remote LTGs is accomplished over the Ethernet 326 to the IP 316. Over LAPD 328 from the IP 316 to the ATM Edge Switch 342 over a dedicated DS0. LAPD over ATM (Circuit Emulation Service) is achieved between the ATM Edge Switch 342 in the switch 316 and the Edge Switch 344 in the remote access gateway. Over LAPD again between the Edge Switch 344 and the RTI 302 over a dedicated DS0. Over HDLC between the RTI 302 and LTG 304a-c.

With the present invention, access and direct control of a TDM network is accomplished, and the services and capabilities of an IP network are ported to the TDM network.

The invention claimed is:

1. A remote switch for connecting to and providing IP access and services to a TDM network, comprising:
 a first switch implemented in a non-TDM network for controlling various components in order to effectuate telecommunications in the non-TDM network;
 an access gateway, at a remote location from the first switch, having a connection to the TDM network and handling TDM switching and networking for the first switch;
 a processor incorporated in the first switch that provides communication adaptation between Ethernet and LAPD by performing protocol conversions using a stored mapping table;
 communication channels connecting the first switch and access gateway, said communication channels obviating a need for TDM links between the TDM network and the first switch;
 the first switch accessing the TDM network through the access gateway via the connection channels, to provide IP access and services to the TDM network;
 the processor being assigned an MCP multicast address to participate in LAN monitoring; and
 the first switch being configured to restrict trunk groups from crossing access gateway boundaries.

2. The remote switch according to claim 1, wherein switch offers call services and capabilities of the non-TDM network.

3. The remote switch according to claim 1, wherein the switch is an IP switch.

4. The remote switch according to claim 1, wherein the processor manages NSP-LTG message transport.

5. The remote switch according to claim 1, wherein the access gateway includes at least one LTG.

6. The remote switch according to claim 1, wherein the access gateway includes an RTI.

7. The remote switch according to claim 1, wherein the access gateway includes a DLU.

8. The remote switch according to claim 1, further comprising a user interface for interfacing a user to the switch.

9. The remote switch according to claim 1, further comprising a lawful intercept processor for intercepting calls and forwarding them to a law enforcement operator.

10. A method for connecting to and providing IP access and services to a TDM network, comprising:
 implementing control of various components using a switch in order to effectuate telecommunications in a non-TDM network;
 accessing the TDM network through an access gateway remote to the switch connection to the TDM network;
 handling TDM switching and networking for the switch by the access gateway;
 providing communication adaptation at the switch between Ethernet and LAPD by performing protocol conversions using a stored mapping table, the communication adaptation being performed using a processor that is assigned an MCP multicast address to participate in LAN monitoring;
 connecting the switch and access gateway through communication channels wherein the communication channels obviate a need for TDM links between the TDM network and the switch;
 the switch accessing the TDM network through the access gateway via the connection to provide IP access and services to the TDM network;
 the switch additionally restricting trunk groups from crossing access gateway boundaries.

11. The method according to claim 10, further offering call services and capabilities of the non-TDM network.

12. The method according to claim 10, wherein the switch is an IP switch.

13. The method according to claim 10, further managing NSP-LTG message transport.

14. The method according to claim 10, further interfacing a user to the switch.

15. The method according to claim 10, further comprising intercepting calls and forwarding them to a law enforcement operator.

* * * * *